United States Patent
Knecht et al.

[11] Patent Number: 6,163,362
[45] Date of Patent: Dec. 19, 2000

[54] PHOTO LAB WITH TRANSPORT ARRANGEMENT

[75] Inventors: Hugo Knecht, Schöfflisdorf; Rudolf Wacker, Rombach; Martin Heller, Zürich, all of Switzerland

[73] Assignee: Gretag Imaging AG, Regensdorf, Switzerland

[21] Appl. No.: 09/166,932

[22] Filed: Oct. 6, 1998

[30] Foreign Application Priority Data

Oct. 13, 1997 [DE] Germany .................. 297 18 125 U

[51] Int. Cl.[7] .................................................. G03B 27/32
[52] U.S. Cl. .................................................. 355/27
[58] Field of Search .................. 355/27, 29, 28, 355/40, 99, 100, 72; 271/162, 225, 230, 303, 304, 3.18, 3.19, 299; 396/30, 612

[56] References Cited

U.S. PATENT DOCUMENTS

| | | | |
|---|---|---|---|
| 3,987,465 | 10/1976 | Sippel | 396/30 |
| 4,191,369 | 3/1980 | Matsuda et al. | 271/299 |
| 4,518,241 | 5/1985 | Huss | 396/612 |
| 4,565,440 | 1/1986 | Bloechl et al. | 355/27 |
| 4,844,442 | 7/1989 | Gammerler | 271/225 |
| 4,864,355 | 9/1989 | Knecht et al. | 355/27 |
| 5,333,851 | 8/1994 | Kulpa | 271/225 |

FOREIGN PATENT DOCUMENTS

| | | |
|---|---|---|
| 0300967A1 | 7/1988 | European Pat. Off. . |
| 0 626 619A2 | 11/1994 | European Pat. Off. . |
| 2 103 812A | 2/1983 | United Kingdom . |

*Primary Examiner*—Russell Adams
*Assistant Examiner*—Rodney Fuller
*Attorney, Agent, or Firm*—Burns, Doane, Swecker & Mathis, LLP

[57] ABSTRACT

The invention relates to an arrangement for the processing of light or photo sensitive material with a printing device. Material separated into individual sections is transportable in a preferred direction of a transporting device. In a material processing device with a moving device, the individual material provided with an image is transported in a predominant direction, the preferred direction and the predominant direction differing from one another at an angle. A device at the end section of the printing device forwards the individual material to the material processing device. In accordance with the invention the forwarding device is positioned in such a way that the individual light or photo sensitive is transferable under the transporting device to the material processing device.

10 Claims, 2 Drawing Sheets

PHOTO LAB WITH TRANSPORT ARRANGEMENT

FIELD OF THE INVENTION

The invention relates to an arrangement for the processing of light or photo sensitive material, as known, for example, from EP 0 300 967 A1.

BACKGROUND OF THE INVENTION

Such an arrangement includes a printing device which is normally referred to as a printer. A picture is here produced on a light or photo sensitive material, whereby the light or photo sensitive material is transported in the form of a section severed from a roller and by way of a conveyor band in the field of activity of the printer. In the field of activity of the printer, the negative is then projected onto the light sensitive material and after the exposure forwarded to a material processing device wherein the exposed light sensitive material can be developed.

In conventional arrangements of this type, normally the light or photo sensitive material was either processed as a continuous band or the printer and the material processing device or the developing station were positioned in series for the processing of individual prints.

In order to achieve a more compact apparatus, the printer in the conventional arrangement was preferably oriented at a right angle to the developing station, whereby individual prints are forwarded by way of a pivotable arrangement from the conveying plane of the printer to the conveying plane of the developing device. However, the conventional arrangement has the problem that the forwarding device must be pivoted through the exposure path of the printer, so that a larger pause is created, since exposure is not possible during the pivoting to and fro. Furthermore, the device of this generic type which is used for the transporting of the print, requires a relatively large amount of space and increases the size of the generic arrangement in a vertical direction.

SUMMARY OF THE INVENTION

It is an object of the present invention to further develop an arrangement for the processing of photo sensitive material so that its operating speed can be significantly improved.

The advantages which are achieved according to the invention are based on the transporting arrangement being positioned such that the individual light or photo sensitive material is passed to the material processing device under the transport path of the printing device, i.e., the paper platform. In this way, the projection path of the printer is not disrupted in any way and in any phase of operation of the arrangement in accordance with the invention, exposure processes can be carried out in the printer without any waiting time. In addition, a forwarding device which is positioned under the transporting path of the printer can be constructed to be much more space saving, or can lead to a significantly more compact construction of the whole arrangement. A corresponding forwarding device can also be used when individual prints are passed on, for example, from a developing station to a drying station or the like. The invention provides an extremely space-saving solution.

In accordance with the invention, individual sheets can be transported in a predominantly vertically upward direction, but they can also be guided downward or moved horizontally. Intermediate directions can also be realized without problem.

It can thereby be an advantage to construct the forwarding device to be pivotable or directionally controllable to forward the material from the transporting device of the printing device or printer to the moving device of the material processing device or the developing device. The forwarding device thereby does not hinder the actual exposure process in any way as already mentioned above.

The forwarding device advantageously includes a fixing device which can hold the material during transport in an especially defined manner. The fixing device can thereby be of diverse construction, whereby a controllable clamping bar, a strap of an elastic material, for example, rubber or the like, or clamps, for example, electromagnetically operable, are provided in an appropriate way on the forwarding device in order to transfer the material from the transporting device to the moving device in a defined position and orientation.

Preferably the forwarding device can also include a guide section which guides the material during the forwarding or during the entry of the material into the forwarding device, receives the material and, if possible, also protects it. The guide section, for example, can be constructed as a sheet steel or a plastic part surrounding the forwarding device, whereby the material is preferably received by the forwarding device under the guide section.

Preferably the forwarding device includes a winding section of round or circular cross section, for example, a wheel, a roller, a cylinder or the like onto which the material can be wound. The material can thereby not only cover a circular section of the wheel or the roller or cylinder, but can also, if the material section is especially large, be wound in an overlapping manner. If the winding section or wheel or the roller are too small in axial direction for certain formats of material sections, the material section can also protrude right or left from the winding section, whereby these protruding portions are preferably surrounded and protected by the guide section. The winding section can include the fixing device in order to hold the material in a defined way during the forwarding.

Another preferred embodiment is achieved when the forwarding device includes a depositing platform onto which the material is deposited in order to be forwarded. The material can thereby be removed from the transporting device of the printing device or the printer, or only drop down at their end in order to land on the depositing platform. The depositing platform itself can then, for example, be swivelled, whereby here the problem could possibly arise that during forwarding of rare formats a defined forwarding is made difficult.

A further advantageous embodiment can be achieved when the forwarding device includes cylinders or rollers or the like which are oriented at an angle to each other such that the material is guided from the preferred direction in which the material is moved on the transporting device to the predominant direction in which the material is transported into the material processing device or the developing device.

As already mentioned above, such a forwarding device can also be used between other components of an arrangement for the production of individual photographic copies, when the individual components are to be positioned at an angle to one another, for example, to save space or to make such an arrangement smaller.

A further preferred embodiment is achieved when the forwarding device includes a band, a segmented band or the like, onto which the material is placed and which is able to transfer the material from the preferred direction to the predominant direction.

An especially preferred and proven embodiment with features according to the invention is achieved when the arrangement in accordance with the invention includes at least one of the following features, preferably all of the following features. These features thereby include that the forwarding device include a roller or cylinder, which is kept in engagement with an elastic band or belt held by rollers in order to clamp the material between the roller or cylinder and the band, whereby the roller or cylinder is pivotable in connection with the band. A further such feature can be seen in that a guide sheet steel is positioned on at least one, preferably both, axial sides of the roller or cylinder to receive therein and guide larger formats of the material, for example, to wind the material within the guide sheet steel onto the roller or cylinder. A further such feature resides in that the transport device of the printing device or printer and the moving device of the material processing device or the developing device or the drying device each include a conveyor band, as apparent, for example, from the generic publication. The forwarding device is thereby positioned at the end region of the transporting device or the starting region of the moving device.

A feeding section can also be provided between the preferred embodiment of the forwarding device according to one of the variants of the invention and the transporting device of the printing device, which takes up the individual material sections and feeds them into the forwarding device at a defined location. The respective material section must be exactly positioned within the printer or on the transporting device of the printer, in order that the image to be exposed can be placed on the material section in a defined way. For this reason, the positioning of the material section on the transporting device of the printing device can be preselected with high accuracy and reproducibility, so that, for example, a guide section or even a guide sheet steel or the like can be provided at the end of the transporting device. This guide section can be provided with active transporting means, for example, adjacent driven cylinders or rollers, or with one or more conveyor bands or belts, which guide a respective material section in a defined way into the forwarding device or transfer it thereto.

A corresponding carry-out device can be provided at the other swivel end of the forwarding device, which carries a respective material section out of the forwarding device and transfers it in a defined way to the moving device of the subsequent material processing device, or developing device.

With respect to the principle construction of a corresponding arrangement with a printing device or printer and a material processing device or developing device or drying device, reference is made to EP 0 300 967 A1, the disclosure of which is expressly incorporated by reference in its entirety also into the disclosure of the present application.

The arrangement shown in EP 0 300 967 A1 shows that the printer is positioned at an essentially right angle to the developing station. It is however also possible to orient these components at other angles to one another, whereby it depends simply on the manner of forwarding between the components in connection with the present invention.

BRIEF DESCRIPTION OF THE DRAWINGS

The present invention will be further discussed in the following with reference to the attached Figures and by way of a preferred embodiment, wherein the Figures are as follows.

DETAILED DESCRIPTION OF THE PREFERRED EMBODIMENT

Figure 1:
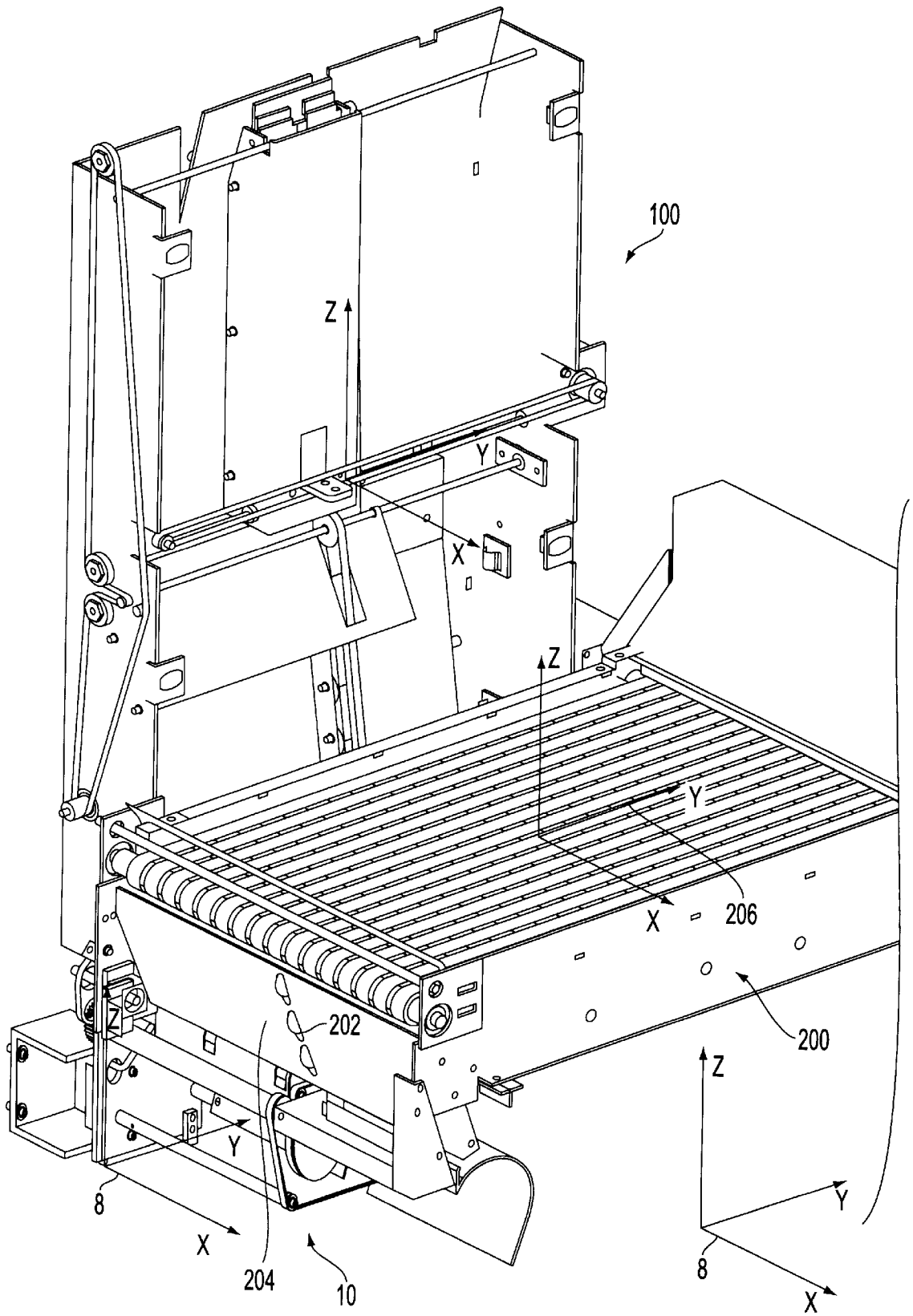
FIG. 1 an arrangement according to an exemplary embodiment of the present invention in a perspective view.

A printing device 200 as shown in more detail in the EP 0 300 967 A1 herein fully incorporated by reference is shown in FIG. 1 as having been modified in accordance with an exemplary embodiment of the present invention. Sections of light or photo sensitive material severed from a roller are transported on a transporting device 206 into the radiation path of the printing device or the printer 200, held thereat, and, for example, exposed by way of a cathode ray tube, a laser, or simply by way of an illumination exposure installation, whereby normally a negative film can be used as original. As soon as the paper material is exposed, the temporarily stopped transporting device 206 can again be placed in operation to transfer the exposed material section into the circle of operations of a feeding device 202, 204, which guides the exposed photographic material in a defined manner to a forwarding device 10.

At the end of the transporting device 206, a material section for a guide sheet steel (not illustrated) can be guided into a gap which is provided between the (not illustrated) guide sheet steel and a guide sheet steel 204. The transport in this gap can be carried out by driven rollers 202, which are, for example, coated with rubber. At the end of the feeding device 202, 204, the forwarding device 10 is provided which is discussed in detail with reference to FIG. 2. The forwarding device 10 swivels around the Z-axis of the coordinate system 8 illustrated in FIG. 1 and transfers, after the forwarding device 10 has been swivelled around an angle of, for example 90°, the transferred material (not illustrated) to the processing device 100, for example, for the further transport, for developing or possibly for drying. The component 100 of the arrangement in accordance with the invention is also apparent from EP 0 300 967 A1.

According to the invention, individual sheets can be guided in the predominant direction (Z) vertically upwardly, but can possibly later also be guided downwardly (direction −Z) or horizontally (direction X or −X), whereby the subsequent transporting direction is principally optional.

Figure 2:
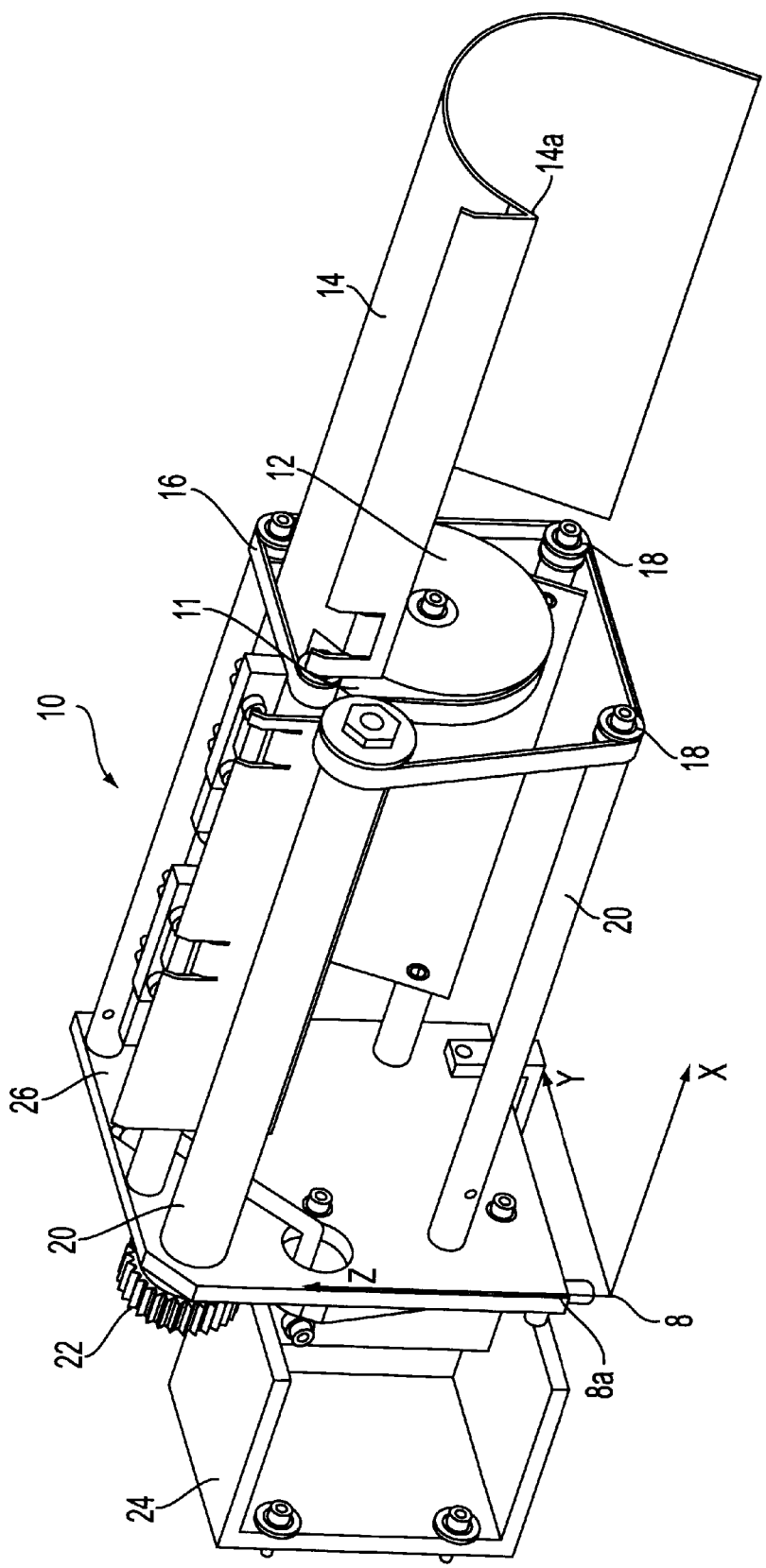
FIG. 2 the arrangement according to FIG. 1, whereby the transporting device of the printer according to FIG. 1 has been omitted.

FIG. 2 illustrates in detail the forwarding device 10 according to an exemplary embodiment of the present invention when a material section arrives from the feeding device 202, 204 according to FIG. 1, this material section is wound in the gap 11 between a winding installation 12, here a wheel, and a belt 16. The guide sheet steel 14 ensures that even larger formats of material sections can be wound between the wheel 12 and the belt 16. The ends of the sections to be wound are hereby guided by the guide sheet steel 14. The portion 14a of the guide sheet steel 14 ensures that the forward end of a section can be wound in an overlapping manner.

The belt 16 is guided over several redirecting wheels 18, whereby one of the redirecting wheels 18 can drive the belt 16 as well as a roller 12 by way of a gear drive 20, 22. The gear 22 is thereby fastened on the construction base 26 and is transferred together therewith from the preferred direction of the transporting device 206 into the predominant direction of the moving device of the material processing device 100. In this illustration, as in FIG. 1, the coordinate system 8 makes it clear that the material sections are transported on the transporting device 206 in the direction −Y and in the processing device 100 in the direction Z, whereby the direction Z, which is separately marked with reference numeral 8*a* is also the pivot axis for the forwarding device 10.

The gear 22 can be driven by way of known mechanical coupling devices, for example, by bevelled gears or the like.

The whole forwarding device 10 is swivelled around a mount 24 which carries the pivot axis of the forwarding device 10.

In passing, it is mentioned that the individual components of the forwarding device 10, of course, can also be constructed differently. So, instead of the belt 16 in connection with the wheels 18, an arrangement of wheels or rollers can be provided which surround the wheel 12 and hold the material section. Instead of a wheel which is relatively small in axial direction, a cylinder which is relatively larger in axial direction can be used.

It is also possible to position more than one forwarding device 10 on a carousel for a faster operation of the forwarding device, so that a significantly faster operation can be realized by, for example, pivoting around 180° in the case of two forwarding devices 10 displaced on the carousel by 180° or, for example, by pivoting about 90° when four forwarding devices 10 are positioned on the carousel which are respectively displaced by 90°.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An arrangement for the processing of photo sensitive material, comprising:

a printing device with a transporting device transporting material divided into individual material sections in a first direction over the printing device and into an exposure path of the printing device;

a material processing device with a moving device, wherein the individual material sections provided with images are transported in a second direction, the first direction and the second direction differing from one another in an angle and being in different planes; and a forwarding device at an end section of the transporting device, being pivotable such that the individual material sections can be transferred from the first direction to the second direction, for forwarding the individual material sections to the material processing device, the forwarding device being positioned in such a way that the individual material sections can be passed under the printing device to the material processing device, the forwarding device further including a fixing device for holding the material during the pivoting and forwarding operation in a defined manner and a guide section for guiding the material during the pivoting and forwarding operation in a defined manner.

2. Arrangement according to claim 1, wherein the forwarding device is directionally controllable to forward the material from the transporting device to the moving device.

3. Arrangement according to claim 1, wherein the forwarding device includes a winding section of circular cross section.

4. Arrangement according to claim 1, wherein the fixing device includes a fastening section having a belt and at least one pressure roller to fix the material during forwarding.

5. Arrangement according to claim 1, wherein the guide section includes a guide sheet made of steel to hold the material at a winding section.

6. Arrangement according to claim 1, wherein the forwarding device includes a movable depositing platform on which the material is deposited to be forwarded, the depositing platform being pivotable and being fed by way of a circulating endless belt.

7. Arrangement according to claim 1, wherein the forwarding device includes at least one of cylinders and rollers oriented at an angle to each other in such a way that they transfer the material from the first direction to the second direction.

8. Arrangement according to claim 1, wherein the forwarding device includes a band onto which the material is deposited and which transfers the material from the first direction to the second direction.

9. Arrangement according to claim 1, wherein at least one of the following features is provided:

a) the forwarding device includes at least one of a roller and cylinder which is held in contact with an elastic band held by way of rollers, to clamp the material between the at least one of a roller and a cylinder and the elastic band, the at least one of a roller and a cylinder being pivotable in connection with the band;

b) a guide section extending from at least one side of the roller or cylinder for guiding larger formats of the material; and c) the transporting device and the moving device respectively include a band, the forwarding device being positioned in at least one of an end region of the transporting device and a starting region of the moving device.

10. Arrangement according to claim 1, wherein at at least one of the end of the transporting device and at the beginning of the moving device, a device is provided to perform at least one of: feeding material to the forwarding device; pulling material out of the forwarding device; and guiding material out of the forwarding device.

* * * * *